United States Patent Office.

EDWARD SEELEY, OF SCRANTON, PENNSYLVANIA.

*Letters Patent No.* 44,117, *dated September* 6, 1864; *reissue No.* 3,764, *dated December* 14, 1869.

IMPROVED COMPOSITION FOR CONCRETE PAVEMENTS.

The Schedule referred to in these Letters Patent and making part of the same.

*To all whom it may concern:*

Be it known that I, EDWARD SEELEY, of Scranton, in the county of Luzerne, and State of Pennsylvania, have invented a new and improved Composition for Concrete Pavements, &c.; and I do hereby declare that the following is a full, clear, and exact description thereof, which will enable others skilled in the art to fully understand and make use of the same.

This invention relates to an improved composition, which can be used with advantage for sidewalks, garden-walks, cellar-floors, and wagon-roads; also, for roofing buildings, for bridge-abutments and arches, for lining reservoirs or aqueducts, and for all other purposes to which durable concrete can be applied.

The ingredients employed are silica, gas-tar, and sulphur. The latter may, however, be omitted, as the two first named alone will produce an improved concrete, when treated as hereinafter stated.

The silica is heated, in a separate vessel, to such a temperature that it will well combine with the gas-tar, which is also heated in a separate vessel, the mixture produced being much more intimate and uniform, and more durable when spread for use, than that produced heretofore by adding the silica in a cold state to the heated gas-tar, in the same vessel, or by its application, in a warm or cold state, to the gas-tar after the latter has been first spread on the surface intended to be covered.

The proportion in which I prefer to use the above-named ingredients for ordinary purposes, such as walks, is about as follows:

Gas-tar, twelve parts; silica, sixty parts, by weight, and sulphur, when used, about three parts; but it must be remarked that this proportion may be varied, according to the use to which the composition is to be put.

The silica, I use in the form of pebbles, or of coarse or fine sand, according to the destination of the composition.

For sidewalks and garden-walks, pebbles can be used; but for roofing-purposes, and for lining reservoirs, &c., I prefer to use sand.

Before I mix these ingredients together, I heat the silica, in a separate vessel, to about 230° Fahrenheit, more or less, being sufficiently heated, however, to make it well combine with the gas-tar, as before stated; and the gas-tar, I melt in a separate vessel, together with the sulphur, if the same is used.

When the tar has been sufficiently heated, I add the heated silica, and stir the whole mass until the silica is diffused uniformly throughout.

When the composition is ready, it is applied hot, by pouring it on the ground, where a walk or floor is to be made, or on the roof or other part of a building, when such part is to be protected against the influence of moisture, or when it is to be used as a lining of a reservoir or aqueduct.

It may be applied in such a state that it will set as soon as it comes in contact with the surface to which it is to be applied.

It forms a water-tight, firm, and durable composition, which is not liable to crack or scale off, and which resists the influence of the atmosphere, and the change of temperature in any climate.

The sulphur aids in binding the other ingredients together, but may be dispensed with, as before stated.

I claim as new, and desire to secure by Letters Patent—

1. The combination of silica, gas-tar, and sulphur, substantially as and for the purposes described.

2. The within-described composition of silica and gas-tar, when prepared substantially in the manner and for the purposes set forth.

3. The herein-described process of preparing the composition, by heating the silica, and then mixing it with the heated gas-tar, substantially as and for the purposes described.

Witnesses:
GEO. W. MABEE,
E. TATE.

EDWARD SEELEY.